US006881757B2

(12) United States Patent
Moodycliffe et al.

(10) Patent No.: US 6,881,757 B2
(45) Date of Patent: *Apr. 19, 2005

(54) AEROSOL BILIQUID FOAM

(75) Inventors: Timothy I. Moodycliffe, Milwaukee, WI (US); Ralph W. Oakeson, Racine, WI (US); Lynn M. Werkowski, Oak Creek, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 96 days.

This patent is subject to a terminal disclaimer.

(21) Appl. No.: 10/291,167

(22) Filed: Nov. 8, 2002

(65) Prior Publication Data

US 2004/0091427 A1 May 13, 2004

(51) Int. Cl.$^7$ .............................. C09K 3/30; C09G 1/18
(52) U.S. Cl. ..................... 516/6; 516/8; 106/3; 106/11; 424/45; 424/405
(58) Field of Search ............................ 516/6, 8, 55, 72, 516/73, 74, 75, 76; 106/3, 11; 424/45, 405; 510/214

(56) References Cited

U.S. PATENT DOCUMENTS

| | | | |
|---|---|---|---|
| 3,669,892 A | 6/1972 | Abler et al | 510/214 |
| 3,965,518 A | 6/1976 | Muoio | 15/104.93 |
| 4,040,857 A | 8/1977 | Lissant | 106/243 |
| 4,347,333 A | 8/1982 | Lohr et al. | 524/269 |
| 4,354,871 A | 10/1982 | Sutton | 106/3 |
| 4,486,333 A | 12/1984 | Sebba | 516/14 |
| 4,880,557 A | 11/1989 | Ohara et al. | 510/189 |
| 5,085,695 A | 2/1992 | Randen et al. | 106/8 |
| 5,171,475 A | 12/1992 | Freisleben | 510/417 |
| 5,397,384 A | 3/1995 | Wisniewski | 106/8 |
| 5,681,377 A | 10/1997 | Lohr et al. | 106/3 |
| 5,705,470 A | 1/1998 | Faris | 510/403 |
| 5,753,607 A | 5/1998 | Burke et al. | 510/242 |
| 5,849,838 A | 12/1998 | Barlow | 524/804 |
| 5,925,607 A | 7/1999 | Flanagan | 510/242 |
| 5,932,328 A | 8/1999 | Burke et al. | 428/212 |
| 5,954,864 A | 9/1999 | Roe | 106/3 |
| 5,977,050 A | 11/1999 | Faris | 510/403 |
| 6,022,727 A | 2/2000 | Worden et al. | 435/243 |
| 6,121,165 A | 9/2000 | Mackey et al. | 442/84 |
| 6,136,775 A | 10/2000 | Strout et al. | 510/439 |
| 6,165,479 A | 12/2000 | Wheeler | 424/400 |
| 6,312,760 B1 | 11/2001 | Wheeler | 427/243 |
| 6,333,362 B1 * | 12/2001 | Lorant | 516/8.1 |
| 2004/0002550 A1 * | 1/2004 | Mercurio | 516/10 |
| 2004/0087667 A1 * | 5/2004 | Mercurio | 516/77 |

FOREIGN PATENT DOCUMENTS

EP 0239084 A2 9/1987 ............ C09G/1/04

OTHER PUBLICATIONS

F. Sebba, Biliquid Foams–A Preliminary Report, 40 J. Colloid. Interface Sci 468–474 (1972),* month un available.
O. Sonneville–Aubrun et al., Surfactant Films In Biliquid Foams, 16 Langmuir 1566–1579 (2000), month unavailable.
A Disperse Technologies Limited 1998 technical presentation entitled "Advanced Topical Dispersion Technology", month unavailable, Falmouth, U.K. (pp. 1–25).

* cited by examiner

*Primary Examiner*—Daniel S. Metzmaier

(57) ABSTRACT

Pressurized mixtures of propellant gasses and liquid surface or air treating materials are disclosed. The liquid materials are in the form of a dispersion which is a biliquid foam with a thickener, where the foam is structured as an oil-in-water complex. The dispersion has an oil portion having a polysiloxane and/or a hydrocarbon oil. There is also surfactant such as one nonionic surfactant and one polar surfactant. Water is also provided.

11 Claims, No Drawings

AEROSOL BILIQUID FOAM

CROSS REFERENCE TO RELATED APPLICATIONS

Not applicable.

STATEMENT REGARDING FEDERALLY SPONSORED RESEARCH AND DEVELOPMENT

Not applicable

BACKGROUND OF THE INVENTION

This invention relates to aerosol dispersions that are highly stable and are useful for treating a variety of surfaces. In particular, it relates to biliquid foam dispersions in aerosol form.

A wide variety of emulsions have been aerosolized by mixing them with gas propellants in an aerosol container. See generally U.S. Pat. Nos. 3,669,892, 4,354,871, 4,880, 557, 5,753,607. These emulsions can deliver furniture polishes, cleaning compounds, insecticidal or insect repellant compounds, herbicidal materials, cosmetic materials, or other desired surface treatment materials.

Common problems encountered in creating such emulsions are that surfactants are necessary for the emulsification, and as the level of surfactant decreases the stability of the emulsion often correspondingly decreases. This can result in either a need to shake the product before use (to obtain the desired mixture), or where surfactant levels are higher side effects due to the presence of high levels of surfactant (e.g. unwanted residues on the surface contacted; skin irritation;

adverse effects on other chemistry such as certain antimicrobial compounds).

Also, in certain emulsions particularly desirable additives (e.g. silicone oils in furniture polish) tend to lead to stability and/or solubility problems unless polar hydrocarbon solvents are also used. Some polar hydrocarbon solvents (especially alcohols) can be undesirable in certain contexts due to environmental or flammability concerns.

As disclosed in U.S. Pat. No. 3,965,518, when desired actives (e.g. furniture polish materials or fragrances) are delivered via an aerosol, an aerosol can may be charged with emulsified active and a propellant. The propellant is typically a hydrocarbon gas such as butane, propane, isobutane, isopropane, or mixtures thereof, or sometimes carbon dioxide. The active is sprayed from the can onto the surface to be treated. Substantial amounts of propellant (e.g. ten percent by weight) are typically added, thereby altering the stability and/or uniformity characteristics of the emulsion.

In unrelated work the art has developed oil-in-water non-aerosol dispersions known as biliquid foams. In these dispersions the oil is present in discrete droplets surrounded by a first surfactant. The remaining water has dissolved in it a second surfactant. The second surfactant migrates to the surfactant-coated surface of the oil to create at least some drops (preferably most oil drops) surrounded by a bilayer of surfactant. See generally U.S. Pat. Nos. 4,486,333 and 6,312,760. See also F. Sebba, Biliquid Foams-A Preliminary Report, 40 J. Colloid. Interface Sci. 468–474 (1972); O. Sonneville-Aubrun et al., Surfactant Films In Biliquid Foams, 16 Langmuir 1566–1579 (2000) and a Disperse Technologies Limited 1998 technical presentation entitled "Advanced Topical Dispersion Technology".

Early versions of these foams suffered from significant instability. However, U.S. Pat. No. 6,165,479 taught that adding a viscosity modifier/thickener to such foams would markedly increase the stability of the foam. However, this patent was focused on formulating cosmetics, and thus did not address design/formulation problems in creating aerosolized biliquid foams.

In this regard, if a designer had considered rendering a non-aerosolized biliquid foam into an aerosolized form, there would have been the concern regarding clogging and non-uniform spray that one would have expected thickening agents to cause. Further, one would have expected that adding a propellant in such high quantity to a biliquid foam dispersion might cause instability concerns and/or uniformity concerns.

Thus, a need still exists for improved aerosolized dispersions, particularly those that are stable over the long term.

SUMMARY OF THE INVENTION

In one form the invention provides a pressurized mixture of a propellant gas, and an aerosolized surface or air treating material in the form of a dispersion. The dispersion includes a biliquid foam (preferably oil-in-water) having a thickener selected from the group consisting of carbomers, colloidal polymers and gums. The dispersion, apart from the thickener, has at least 0.01% by weight of an oil selected from the group consisting of polysiloxanes and hydrocarbon oils, between 0.0001% and 2% by weight of surfactant, and at least 10% by weight of water.

While, in preferred forms the propellant gas is a hydrocarbon gas, compressed air may be used, and the invention is not limited to such gases. The inventive formulation, for example, is perfectly stable with compressed air and may be stable with other propellants. The mixture is a surface treating material such as furniture polish, carpet cleaner, hard surface cleaner or insect control agent, and the dispersion, apart from the thickener, comprises between 0.0001% and 2% by weight of nonionic surfactant, and between 0.0001% and 2% by weight of a surfactant selected from the group consisting of anionic surfactants, cationic surfactants and amphoteric surfactants.

In other preferred forms the thickener is a salt of a cross-linked polymer of acrylic acid, and the dispersion, apart from the thickener, comprises at least 1% by weight mineral oil and at least 1% by weight of polysiloxane. If desired the dispersion can have two different polysiloxanes having different viscosities from each other. Most preferably, the overall viscosity of the dispersion (apart from the propellant gas) is between 200 and 10,000 cps at 25° C. measured using the standard Brookfield viscometer system—sP2-30 rpm.

In another aspect methods of using the above mixtures are disclosed. One sprays the mixtures on a surface from an aerosol can, and optionally rubs the sprayed surface with a cloth, brush or other device.

For example, the consumer can spray an aerosol furniture polish onto a piece of furniture. They can then rub the polish in with a cloth made of mixtures of cellulosic fibers with other natural or synthetic fibers (e.g. cotton or wool), or entirely formed of natural or synthetic fibers (e.g. rayon, polyamide fibers, acrylonitrile fibers, polyester fibers, vinyl fibers, protein fibers, fluorocarbon fibers, dinitrile fibers, etc.). A clothing rag is also a suitable type of rubbing cloth.

The dispersion should include a thickener/viscosity modifier such as carbomers (such as a polymer of acrylic acid that has been cross-linked with a polyfunctional agent), colloidal polymers, or gums at a very low concentration (between 0.05 and 2%; preferably between 0.05 and 0.5%; even more preferably between 0.05 and 0.3%). Other examples are alginate gums or their salts, guar gum, locust bean gum, xanthane gum, gum acacia, gelatin, hydroxymethylcellulose, hydroxyethyl-cellulose, hydroxypropylcellulose, carboxymethylcellulose, salts of these compounds, bentonites, magnesium aluminum silicates, and glyceryl polymethacrylates and their dispersions in glycols, and mixtures thereof. The most preferred thickener for a furniture polish is a salt of a cross-linked polymer of acrylic acid known as Carbopol® Ultrez 5(which is available from B.F. Goodrich). Specifically, it is a polymer of acrylic acid cross-linked with allylpentaerythritol.

There may also be an antimicrobial agent to prevent bacterial growth during storage, or to provide antibacterial effects to the surface being treated. The dispersion may also have other optional ingredients. For example, there may be a preservative such as Kathon® CG/ICP, which is available from Rohm and Haas, appropriately pH adjusted with sodium hydroxide.

In the case of furniture polishes, there may also be scratch cover colorants, fragrances and other additives as are conventional in the furniture polishing field. See generally U.S. Pat. No. 5,849,838.

Where the product is a hard surface cleaner, additives conventional for those products (e.g. those that have previously been used in aerosol emulsions) will be incorporated into these dispersions in similar concentrations (albeit with the surfactants correspondingly lower). Similarly, for aerosolized dispersions carrying actives (e.g. insecticidal; herbicidal; fragrances; deodorizers), standard aerosolized emulsions will be modified to reduce their surfactant content, provide the required thickener, and otherwise create the biliquid foam.

A wide variety of nonionic surfactants appear to be useful for the purposes of the present invention. We particularly prefer the use of Laureth-4 (polyethylene glycol ether of lauryl alcohol). However, one could instead use an alkanolamide, an ester of a polyhydric alcohol (for example an ester of an ethylene, diethylene or propylene glycol, or glycerol or a polyglycerol, or sorbitan, glucose or sucrose), a polyoxyethylene or polyoxypropylene derivative of an alcohol, amide or ester, or a polyoxyethylene/polyoxypropylene block copolymer, or a suitable compatible mixture thereof.

The other surfactant (when, as is typical, two are used) can be selected from a wide variety of more polar surfactants. We prefer the anionic surfactant sodium lauryl ether sulphate. However, numerous other anionics should be suitable. Examples are acyl-lactate, N-acylsarcosinate, alkylcarboxylate (either mono- or polyvalent), alkyl ether carboxylate, N-alkyl-glutamate, fatty acid-peptide condensate, phosphated ethoxylated alcohol, alkyl sulphate, ethoxylated alkyl sulphate, alpha-olefin sulphonate and ester-linked sulphonate.

The other surfactant may also be a cationic surfactant, an example of which is an amidoamine. Alternatively, the other surfactant might be an amphoteric such as acylaminoacid, an N-substituted alkylamine, an N-alkyl-β-aminopropionate, an N-alkylbetaine, an alkylimidazoline and a sulphobetaine.

The preferred polysiloxanes are dimethylpolysiloxanes. However, other silicones can also be used. Preferred viscosity ranges are between 50 cSt and 5,000 cSt. Further, a wide variety of hydrocarbon oils should be suitable.

While preferred embodiments have been discussed above and will be discussed below, it should be appreciated that these are merely examples of the invention and the claims should not be construed as limited only to them. For a more complete appreciation of the full scope of the invention the claims should be reviewed.

DETAILED DESCRIPTION OF THE PREFERRED EMBODIMENTS

A preferred mixture of a propellant gas and treating material for use in the present invention, in the form of a furniture polish, has the following formula:

| Weight Percent | Common name (may be a commercial name) | Chemical Name |
|---|---|---|
| to 100% | | water |
| 10% | B-52 propellant | butane/propane mix |
| .2% | Carbopol ® Ultrez 5 | carbomer |
| 9.82% | Klearol | white mineral oil |
| 4% | PDMS 100 cSt | polydimethylsiloxane |
| 4% | PDMS 1000 cSt | polydimethylsiloxane |
| .18% | nonionic surfactant | Laureth-4 |
| .02% | anionic surfactant | sodium lauryl ether sulphate |
| .05% | Kathon ® CG/ICP | methychloroisothiazolone |
| .53% | | sodium hydroxide |

Klearol mineral oil is available from Witco Corp. and consists of saturated aliphatic and alicyclic non-polar hydrocarbons. The polysiloxanes can be obtained from a variety of different sources, such as Wacker Silicones or Dow Corning. Laureth-4 is a widely available nonionic surfactant (also known as polyethylene glycol ether of lauryl alcohol).

In producing the dispersion, one first mixes the three oil components with the nonionic surfactant (Laureth-4). One then separately mixes the water, thickener, anionic surfactant (sodium lauryl ether sulphate), Kathon® preservative and sodium hydroxide. At this point, one takes about 10 percent of the water phase and places it in a container. One then slowly drops the oil phase into the water phase while gently stirring at the top surface of the oil phase.

Once the oil phase has been entirely added to the container, one then adds the remaining portion of the water phase. This latter step can be done more quickly than the step of addition of the oil to the 10 percent of the water.

The reason for this particular preferred method of formation of the biliquid foam is to provide the oil with the ability to be completely surrounded by the water phase in a properly ordered manner. This helps greatly in the formation of the biliquid foam.

One then places the liquid dispersion in a pressurizable container and then adds a propellant gas to the container using a conventional gas filling technique. The container can have a conventional exit valve structure so that the mixture can be expelled from the aerosol container by pressing a button or the like.

A preferred treating material in the form of an insecticidal control agent, for use in the present invention upon addition of a propellant gas, has the following formula:

| Weight Percent | Common name (may be a commercial name) | Chemical Name |
|---|---|---|
| to 100% | | water |
| .2% | Carbopol ® Ultrez 5 | carbomer |
| 1% | Klearol | mineral oil |
| 15% | DEET | insecticide |
| .18% | nonionic surfactant | Laureth-4 |
| .02% | anionic surfactant | sodium lauryl ether sulphate |
| .05% | Kathon ® CG/ICP | methychloroisothiazolone |
| .53% | | sodium hydroxide |

This formula can be mixed in a manner analogous to that used for the furniture polish. Then, it can be placed in an aerosol dispenser can with pressurized gas in a manner analogous to that used for the furniture polish.

A preferred treating material in the form of a hard surface cleaner, for use in the present invention upon addition of a propellant gas, has the following formula:

| Weight Percent | Common name (may be a commercial name) | Chemical Name |
|---|---|---|
| to 100% | | water |
| .2% | Carbopol ® Ultrez 5 | carbomer |
| .1% | Klearol | mineral oil |
| .18% | nonionic surfactant | Laureth-4 |
| .02% | anionic surfactant | sodium lauryl ether sulphate |
| .05% | Kathon ® CG/ICP | methychloroisothiazolone |
| .53% | | sodium hydroxide |

This formula can also be mixed in a manner analogous to that used for the furniture polish. Then, it can be placed in an aerosol dispenser can with pressurized gas in a manner analogous to that used for the furniture polish.

It should be particularly noted that the formulations of the present invention do not need to have polar volatile cosolvents to achieve stability, even when polysiloxanes are present. This may have certain advantages in jurisdictions that are particularly environmentally conscious. It may also have advantages where the treating material is applied to certain sensitive surfaces.

For example, the mixture can be essentially free of organic solvents having a volatility of greater than 1 mm/Hg at 25° C. Alternatively, the mixture can be essentially free of organic solvents having a volatility of greater than 1.3 mm/Hg at 25° C. Further, the mixture can be alcohol free.

While the preferred preservative is Kathon® CG/ICP, the formulations may also contain other antimicrobial agents such as an ester of p-hydroxybenzoic acid, formalin or imidazolidinylurea.

The furniture polish may be used in a manner similar to the way that aerosol furniture polishes such as Pledge® brand polishes are currently used. In this regard, one takes the polish and sprays a desired amount (e.g. several ml of the polish) on a relatively small surface of furniture (e.g. a square meter) to be polished. The container will be held about six inches away from the surface to apply the polish. The polish is then spread and worked in by rubbing a cloth or other wipe over the surface (which desirably simultaneously acts to remove dust from the surface and place it on the rubbing cloth). The surface may also be buffed if desired (as would be the case for a floor polish).

For insecticides, deodorizers and fragrances the spray can either be sprayed into the air, or at a target. For other surface treatment chemicals the spray can be directed at the surface in a conventional mariner.

Due to the stability of the dispersion, the container need not be shaken or mixed prior to use, even though low levels of surfactant are used. Further, the biliquid foam polish formulations tested to date have provided surprising cleaning performance, as well as desirable gloss, wipeability, and visual aesthetic characteristics.

While the preferred embodiments have been described above, there are numerous other embodiments that are within the spirit and scope of the invention. Thus, the claims should be looked to in order to appreciate the full scope of the invention, and the claims are not to be construed to be limited to just the preferred embodiments.

INDUSTRIAL APPLICABILITY

The invention provides aerosolized surface and air treating materials (e.g. polishes, cleaners and fragrancers) that are stored in the form of sprayable biliquid foams, and methods for their use.

We claim:

1. A pressurized mixture of a propellant gas and an aerosol surface or air treating material, the mixture comprising:
   a propellant gas; and
   a liquid in the form of a dispersion, the dispersion comprising a biliquid foam having a thickener selected from the group consisting of carbomers, colloidal polymers and gums, the dispersion, apart from the thickener, comprising:
      at least 0.01% by weight of an oil selected from the group consisting of polysiloxanes and hydrocarbon oils;
      between 0.0001% and 2% by weight of surfactant; and
      at least 10% by weight of water.

2. The pressurized mixture of claim 1, wherein the propellant gas is a hydrocarbon gas.

3. The pressurized mixture of claim 1, wherein the mixture is selected from the group consisting of furniture polishes, hard surface cleaners, and insect control agents.

4. The pressurized mixture of claim 3, wherein the dispersion, apart from the thickener, comprises between 0.0001% and 2% by weight of nonionic surfactant, and between 0.0001% and 2% by weight of a surfactant selected from the group consisting of anionic surfactants, cationic surfactants and amphoteric surfactants.

5. A pressurized mixture of a propellant gas and an aerosol surface or air treating material, the mixture comprising:
   a propellant gas; and
   a liquid in the form of a dispersion, the dispersion comprising a biliquid foam having a thickener selected from the group consisting of carbomers, colloidal polymers and gums, the dispersion, apart from the thickener, comprising:
      at least 0.01% by weight of an oil selected from the group consisting of polysiloxanes and hydrocarbon oils;
      between 0.0001% and 2% by weight of surfactant; and
      at least 10% by weight of water;
   wherein the thickener is a salt of a cross-linked polymer of acrylic acid.

6. A pressurized mixture of a propellant gas and an aerosol surface or air treating material, the mixture comprising:
   a propellant gas; and
   a liquid in the form of a dispersion, the dispersion comprising a biliquid foam having a thickener selected from the group consisting of carbomers, colloidal polymers and gums, the dispersion, apart from the thickener, comprising:
      at least 0.01% by weight of an oil selected from the group consisting of polysiloxanes and hydrocarbon oils;
      between 0.0001% and 2% by weight of surfactant; and
      at least 10% by weight of water;
   wherein the dispersion, apart from the thickener, comprises at least 1% by weight mineral oil and at least 1% by weight of polysiloxane.

7. The pressurized mixture of claim 6, wherein the dispersion, apart from the thickener, comprises two different polysiloxanes having different viscosities from each other.

8. A pressurized mixture of a propellant gas and an aerosol surface or air treating material, the mixture comprising:
   a propellant gas;
   a liquid in the form of a dispersion, the dispersion comprising a biliquid foam having a thickener selected from the group consisting of carbomers, colloidal polymers and gums, the dispersion, apart from the thickener, comprising:
      at least 0.01% by weight of an oil selected from the group consisting of polysiloxanes and hydrocarbon oils;
      between 0.0001% and 2% by weight of surfactant; and
      at least 10% by weight of water; and
   an antimicrobial agent.

9. The pressurized mixture of claim 1, wherein the dispersion, apart from the thickener, comprises no more than 1% by weight of surfactant in total.

10. The pressurized mixture of claim 1, wherein the dispersion has a viscosity of between 200 to 10,000 cps at 25° C. using the aforementioned standard viscosity test system.

11. A method of treating a targeted surface, comprising:
   obtaining an aerosol container having a gas propellant, and a liquid in the form of a dispersion, the dispersion comprising a biliquid foam having a thickener selected from the group consisting of carbomers, colloidal polymers and gums, the dispersion, apart from the thickener, comprising:
      at least 1% by weight of silicone oil;
      at least 1% by weight of mineral oil;
      between 0.0001% and 2% by weight of nonionic surfactant;
      between 0.0001% and 2% by weight of a surfactant selected from the group consisting of anionic surfactants, cationic surfactants and amphoteric surfactants; and
      at least 10% by weight of water; and
   spraying at least the dispersion portion of the mixture against the surface.

* * * * *